United States Patent [19]

Marotta et al.

[11] Patent Number: 4,613,745
[45] Date of Patent: Sep. 23, 1986

[54] ELECTRIC WATER HEATING APPARATUS FOR A DRIP COFFEE MAKER

[75] Inventors: Vincent G. Marotta; Ikuo I. Komatsu, both of Shaker Heights, Ohio

[73] Assignee: North American Systems, Inc., Bedford Heights, Ohio

[21] Appl. No.: 597,505

[22] Filed: Apr. 6, 1984

[51] Int. Cl.⁴ .................. A47J 31/057; A47J 31/10; F24H 1/10; H05B 1/00

[52] U.S. Cl. .................. 219/297; 99/281; 99/282; 99/288; 99/305; 99/306; 219/302; 219/305; 219/314; 219/441; 222/146.5

[58] Field of Search .............. 219/296, 297–299, 219/302–305, 314, 308, 309, 323, 324, 328, 441, 442; 99/280–283, 285, 288, 295, 300, 304–307; 222/146.5

[56] References Cited

U.S. PATENT DOCUMENTS

| | | | |
|---|---|---|---|
| 2,682,601 | 6/1954 | Andres et al. | 99/306 X |
| 3,138,698 | 6/1964 | Wells et al. | 219/441 |
| 3,463,075 | 8/1969 | Wickenberg | 99/282 |
| 3,469,552 | 9/1969 | Prosen | 99/281 X |
| 3,552,298 | 1/1971 | Bufkin | 99/281 |
| 3,693,535 | 9/1972 | Abel | 99/288 X |
| 3,987,717 | 10/1976 | Bergmann et al. | 99/280 |
| 4,000,396 | 12/1976 | Abel | 219/314 |
| 4,008,656 | 2/1977 | Gruner | 99/298 |
| 4,278,013 | 7/1981 | Noren et al. | 99/288 |
| 4,361,750 | 11/1982 | Miklas | 219/297 |

FOREIGN PATENT DOCUMENTS

| | | | |
|---|---|---|---|
| 2253157 | 5/1974 | Fed. Rep. of Germany | 99/282 |
| 2653300 | 6/1978 | Fed. Rep. of Germany | |
| 1510114 | 5/1978 | United Kingdom | 219/331 |

*Primary Examiner*—A. Bartis
*Attorney, Agent, or Firm*—Yount & Tarolli

[57] ABSTRACT

An electric automatic water heating apparatus for drip type beverage, e.g., coffee makers has a housing provided with a reservoir composed of a material of low thermal conductivity arranged to supply water by gravity to a sealed heating chamber having an inlet communicating with the reservoir and an outlet for discharging heated water for use. The sealed heating chamber includes an open top, cup-shaped, metallic casting having an electric rod-type resistance heating element embedded therein, and a metallic cover member closing the open top of the casting for confining steam generated during heating to the heating chamber. The cover is secured to and forms a bottom surface portion of the reservoir exposed to the water in therein. The cover serves as a support for a bimetallic member which controls the flow of water through the inlet into the heating chamber in response to the temperature in the heating chamber. Seals are provided between the heating chamber and housing for blocking flow of steam or water from the heating chamber into the housing area containing electrical components.

14 Claims, 12 Drawing Figures

4,613,745

ELECTRIC WATER HEATING APPARATUS FOR A DRIP COFFEE MAKER

FIELD OF INVENTION

The present invention relates generally to automatic drip electric coffee makers, but it is to be understood that certain major features of the hereinafter disclosed embodiment of the invention have broader utility and application to hot beverages other than coffee.

SUMMARY OF INVENTION

Many advantages can be obtained from a heating unit for an automatic drip coffee maker which has a practical, economical and effective design to confine steam during the heating process. Confining steam during the heating process not only limits heat loss but also prevents steam from leaking into other parts of the coffee maker and recondensing. The heating system operation is also quieter.

A purpose of the present invention is to provide a structure which is practical, economical and effective in confining steam. Other purposes, objects and advantages of the present invention are described in more detail herein.

Electric automatic water heating apparatus of the present invention is provided with a sealed heating chamber to confine steam generated during heating. In the preferred form, a sealed chamber is formed from a heater casting containing an embedded heating element or resistance rod-type heater. A thermally conductive cover member is sealed to the heater casting with a resilient seal therebetween. The cover and the heater casting form a sealed heating chamber, and steam is confined thereto during the heating process as described in more detail hereinafter.

The cover member also serves as a support for a bimetallic member which controls the flow of water from a reservoir into the sealed heating chamber.

The sealed heating chamber is also positioned or otherwise sealed in the surrounding coffee brewer housing so as to further prevent any leakage of the steam into other parts of the coffee maker. For example, the outlet from the sealed heating chamber into a coffee basket is surrounded by a resilient seal between the outlet and a portion of the coffee brewer housing.

BRIEF DESCRIPTION OF DRAWINGS

Other purposes, objects and advantages will appear from the following description of a preferred embodiment in the drawings wherein.

INCORPORATION BY REFERENCE

The description of U.S. Pat. No. 4,000,396 is hereby incorporated by reference herein.

DESCRIPTION OF PREFERRED EMBODIMENT

General Arrangement

The preferred embodiment herein will be described with reference to an automatic drip coffee maker, but as noted above, certain major features hereof have broader utility and application for other beverages.

Figure 1:
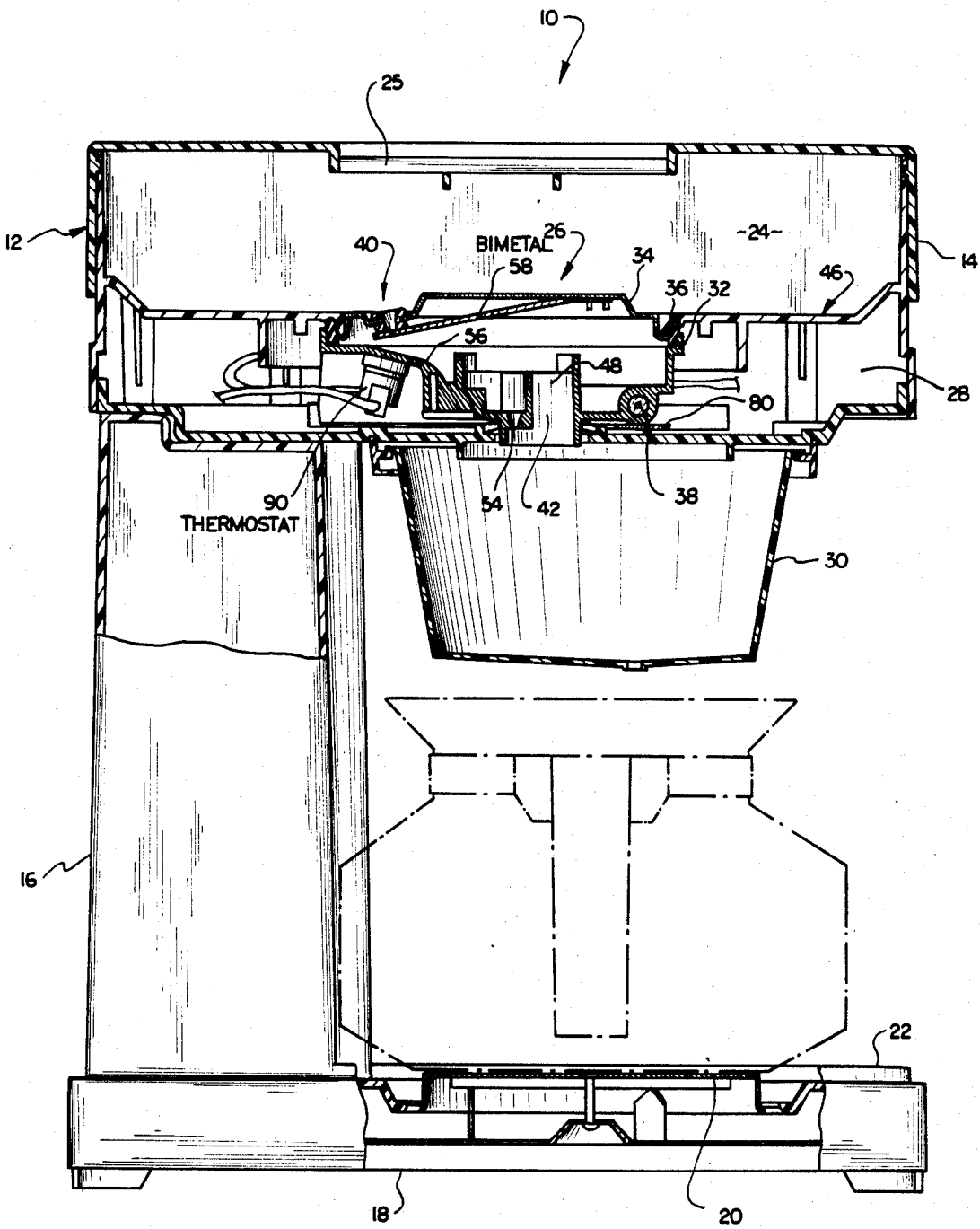
FIG. 1 is a vertical section taken generally centrally and longitudinally through the coffee brewing machine embodying the present invention.

The particular embodiment of the electric automatic water heating apparatus or coffee brewer 10 of the present invention appearing in FIG. 1 comprises, a housing 12 which has three major components: a hood element 14, a column support 16 and a pedestal element 18. The column support 16 is integrally connected to the pedestal element 18 and the hood portion 14. The pedestal element 18 serves as a support for the coffee brewer 10 and contains a warming plate 20 upon which is depicted a coffee carafe. Surrounding the warming plate 20 is a raised lip 22 which is intended to prevent the carafe from sliding off of the warming plate 20.

The hood portion 14 of the coffee brewer 10 contains, as major components, a water reservoir 24, a sealed heating chamber generally designated as 26, and various electrical components. The sealed heating chamber 26 will be described in more detail hereinafter. Water is added to reservoir 24 through a grate 25 in the upper surface of the coffee brewer. The hood portion 14 contains a housing portion 28 having electrical components which are exteriorly located from the sealed heating chamber 26.

One purpose of the present invention is to prevent steam from leaking out of the sealed heating chamber 26 and recondensing in the portion 28 of the housing member 12 containing electrical components.

The hood portion 14 also serves to receive and support a slidably insertable coffee basket 30. The coffee basket 30 is of course intended to contain a coffee filter and coffee grounds for brewing coffee.

General Heating System

The general heating system of the present invention will now be described, particularly with reference to FIGS. 2-4. The sealed heating chamber 26 comprises as its major members a thermally conductive heating member 32 and a thermally conductive cover member 34. The cover member is preferably constructed of a metallic material such as aluminum. Cover member 34 is sealed to the thermally conductive heating member 32 by suitable means, preferably by a resilient, thermally resistant seal 36.

Figure 9:
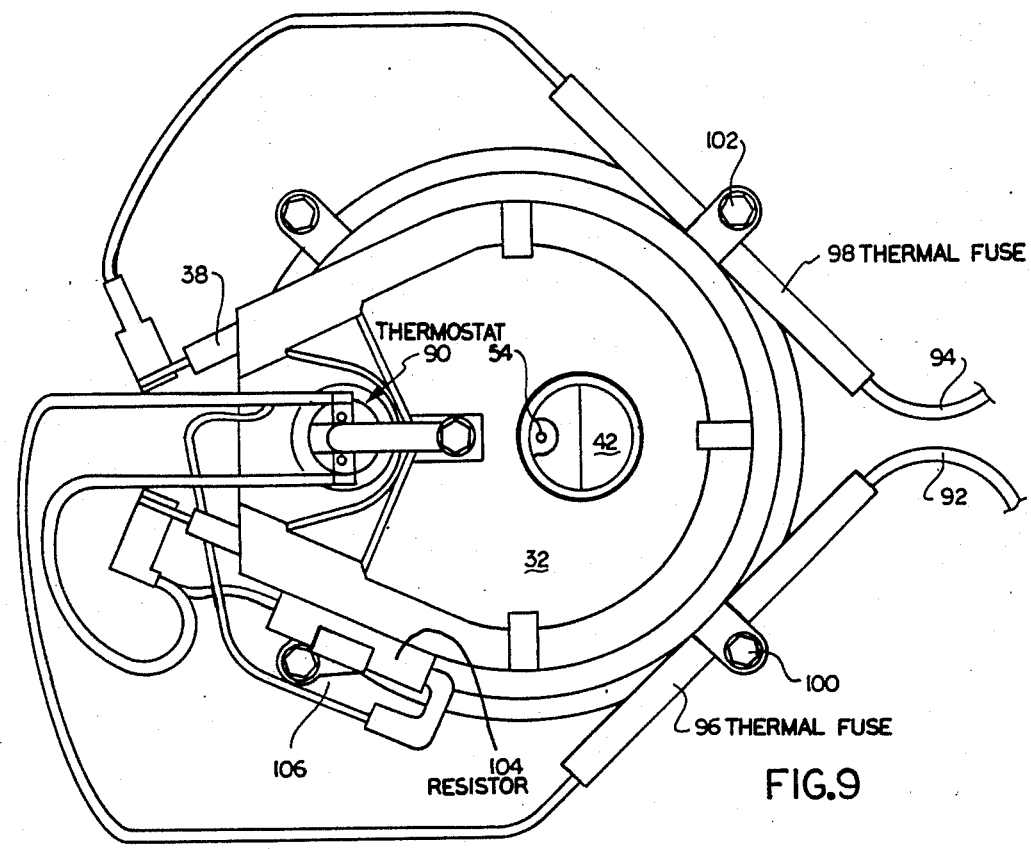
FIG. 9 is a bottom plan view of the heater casting showing the exterior electrical elements of the coffee brewer.

Preferably, the thermally conductive heating member 32 is a metallic heater casting. Embedded within the heater casting 32 is a resistance rod-type heater 38. As seen in FIG. 9, the resistance rod-type heater 38 forms a generally horse-shoe shaped ridge around the perimeter of the heater casting 32. The resistant rod-type heater 38 is embedded in a lower portion or well bottom in the heater casting 32, and heat is conducted through the heater casting 32 from the resistance rod-type heater 38 to any water present in the sealed heating chamber 26.

Figure 2:
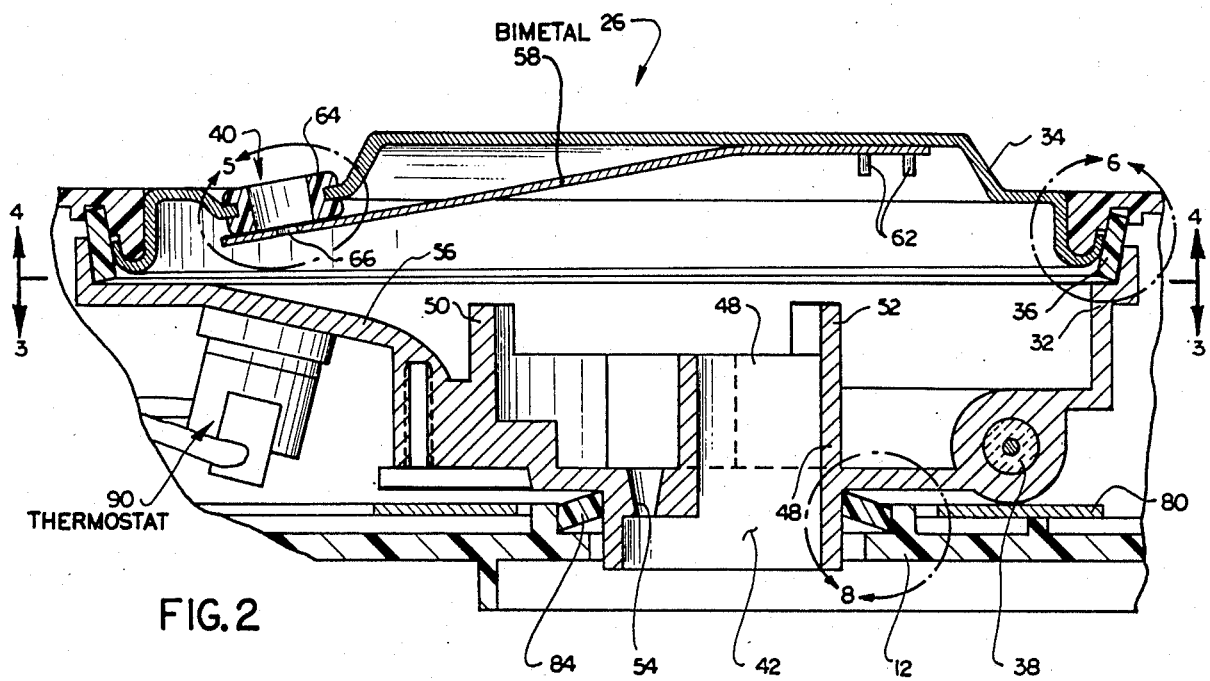
FIG. 2 is an enlarged sectional view of the sealed heating unit depicted in FIG. 1.
Figure 3:
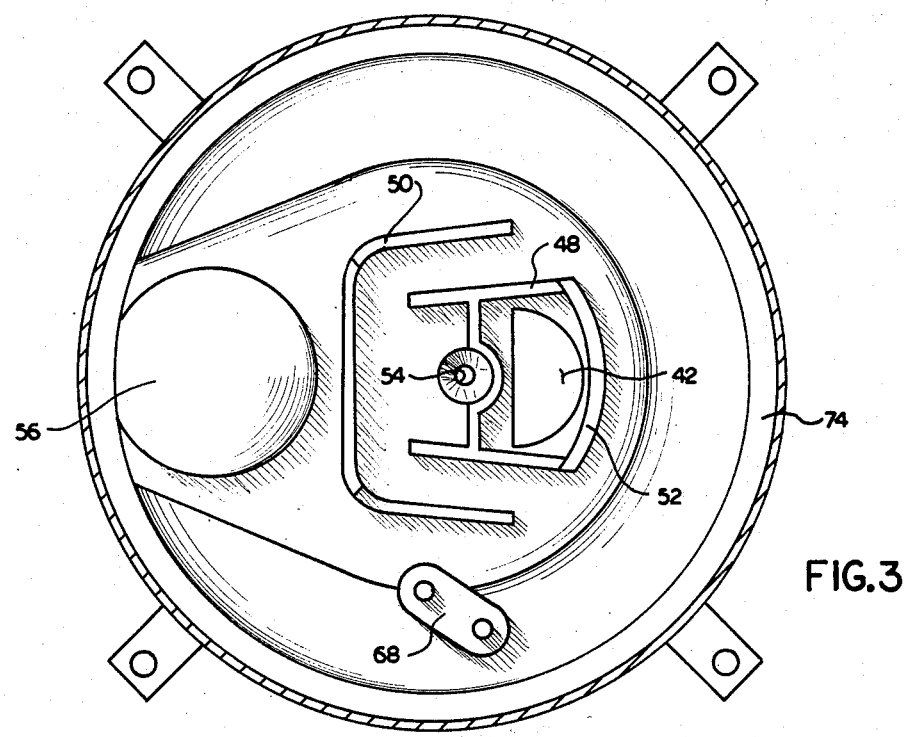
FIG. 3 is an enlarged plan view of the interior portion of the heater casting generally taken along line 3—3 of FIG. 2.

As seen particularly in FIGS. 2-3, the sealed heating chamber 26 provides for a generally horizontal flow path for the water from inlet or opening 40 to outlet 42. The outlet 42 is horizontally offset from the inlet 40 to provide the generally horizontal flow path of the water from the reservoir 24.

The thermally conductive cover member 34 forms a portion of the bottom surface 46 of the reservoir 24. The reservoir and many components of the housing 12 are made from a thermally nonconductive material, such as plastic, e.g., polypropylene. The cover member 34 has an opening 40 through which any water in reservoir 24 is designed to flow into the sealed heating chamber 26. The thermally conductive cover, preferably of metal, is in thermal contact on one side with the cool reservoir water and on the other side with the sealed heating chamber 26. Thus, the cover member 34 helps transfer a significant amount of heat to the cool reservoir water to preheat it before entering the sealed chamber 26 and also helps recondense steam within the sealed heating chamber 26 due to the relative coolness of the reservoir water.

Surrounding the outlet 42 is a generally vertically upstanding standpipe 48 which serves to establish a water level within the sealed heating chamber 26. Between the inlet 40 and the outlet 42 of the sealed heating chamber is an additional deflecting barrier 50 which is designed to further deflect the generally horizontally flowing water from the inlet to the outlet to ensure sufficient transient time in the sealed heating chamber for proper heating. The deflecting barrier 50 is generally U-shaped, having legs which surround a portion of the standpipe 48. Preferably, one section of the standpipe 48 has a higher wall section 52 oppositely facing the additional barrier 50. Standpipe 48 and the additional water deflecting barrier 50 help reduce any "overshoot" of water from the inlet to the outlet. The heater casting 32 is also provided with a small additional drain hole 54 which is designed to drain the heater casting dry at the end of an operating cycle. A slightly rounded and raised portion 56 on the heater casting 32 is designed to house a thermostat 90 in direct thermal contact therewith for purposes explained in more detail hereinafter.

Figure 4:
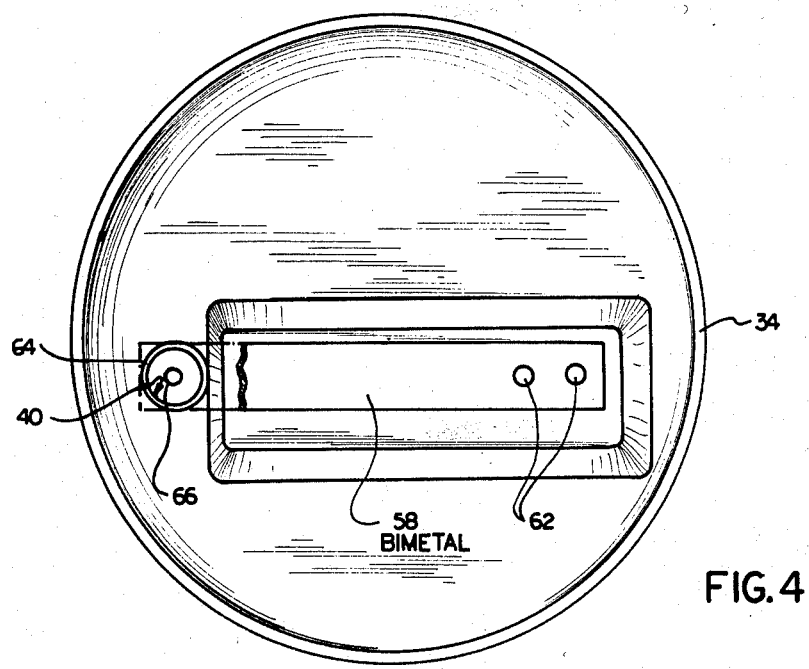
FIG. 4 is an enlarged plan view of the lower surface of the cover portion generally taken along line 4—4 of FIG. 2.

The underside of cover member 34 is shown in more detail in FIG. 4 wherein certain portions are broken away for clarity. The coffee brewer of the present invention may have one or two bimetallic members 58 and 60. The primary bimetallic member 58 is secured to cover member 34 by suitable means such as rivets 62. The bimetallic member 58 will then be in thermal contact with the cover member 34, the upper portion of which is exposed to any water present in the reservoir 24. The end of the bimetallic member 58 opposite the end fixed by securing means 62 is in contact with a valve member 64, such as a rubber grommet which is embedded and secured to the cover member 34. The primary bimetallic member 58 also may have a small perforation 66 in alignment with the opening 40 for reasons expressed more clearly herein.

If desired, the coffee brewer of the present invention may also have a secondary bimetallic member 60 which is secured to a post 68, which is an integral part of heater casting 32. The secondary bimetallic member 60 has an end sealing against a second valve member 70 containing a smaller opening 72 compared to opening 40 adjacent the primary bimetallic member 58. The bimetallic members 58 and 60 are part of the flow control system of the present invention and will be described more detail in the next section.

Flow Control System

Figure 5:
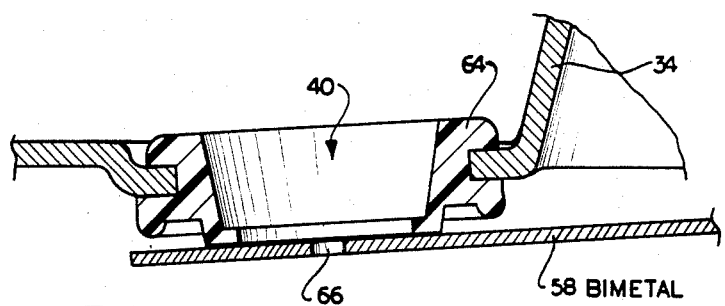
FIG. 5 is an enlarged sectional view of the circled portion in FIG. 2 marked with the numeral 5.

As shown in more detail in FIG. 5, one end of the primary bimetallic member 58 is in sealing engagement, as shown in FIG. 5, with a valve member 64. The valve member 64 in FIG. 5 preferably is a resilient rubber-like grommet which is embedded and secured to thermally conductive cover member 34. Centrally located within the rubber valve member 64 is an opening 40 serving as an outlet for the water from the reservoir 24 into the sealed heater chamber 26.

In one form of the present invention, a small perforation 66 is provided in bimetallic member 58 in alignment with the opening 40. In that form, a coffee brewer having suitable electrical switches is designed to allow a small amount of water to trickle through perforation 66 from the reservoir 24 into the sealed heating chamber 26 shortly after water is poured into reservoir 24. The small amount of water is then heated within the sealed heating chamber, and steam from the heated water contacts the primary bimetallic member 58. In that way, the primary bimetallic member 58 is in both thermal contact with the cool water in the reservoir 24 and also senses the heated steam within the sealed heating chamber 26. Thus, the bimetallic member 58 varies in its deflection from valve member 64 to compensate for the amount of water flowing into the sealed heating chamber and the temperature of the water therein, as described in more detail in U.S. Pat. No. 4,000,396.

Modulation of water flow from the reservoir into the sealed chamber 26 occurs through a balancing of (i) the heat effect from the steam in the sealed chamber 26 on the bimetallic member 58 and (ii) the cooling effect by cool water entering the sealed chamber and by thermal conduction from the cool water in the reservoir through the cover to the bimetallic member 58. The thermally conductive cover 34, preferably of metal, insures cooling of the bimetallic member by thermal conduction, and also transfers heat from the sealed chamber 26 to the water reservoir and helps recondense steam within the chamber 26.

The coffee brewer of the present invention can also be designed to brew coffee at a set period of time in the future, such as by use of a clock. If such a structure is desired, the present invention utilizes both primary and secondary bimetallic members 58, 60. When using both bimetallic members, the primary bimetallic member does not possess any perforations 66, so as to retain water in reservoir 24 until the desired brewing time. The secondary bimetallic member 60 is secured to the casting on post 68 and also has no perforation in its end. In that way, water existing in the reservoir 24 will not leak into the heater casting chamber 26. When power is supplied to the resistance rod heating element 38, such as by a clock, heat is conducted through the mounting post 68 to the secondary bimetallic member 60. The heating up of the secondary bimetallic member 60 causes it to deflect and allow an initial flow of water through opening 72 and past valve member 70. This small trickle of water corresponds to that described above which passes through perforation 66. The operation of the primary bimetallic member 58 is then similar to that described above.

The operation of a bimetallic member is described in more detail in U.S. Pat. No. 4,000,396, at column 7, lines 13 to column 8, line 29.

Sealed Heating Chamber

The particular way in which the sealed heating chamber 26 is designed to prevent the escape of steam into other parts of the coffee brewer will now be described.

Figure 6:
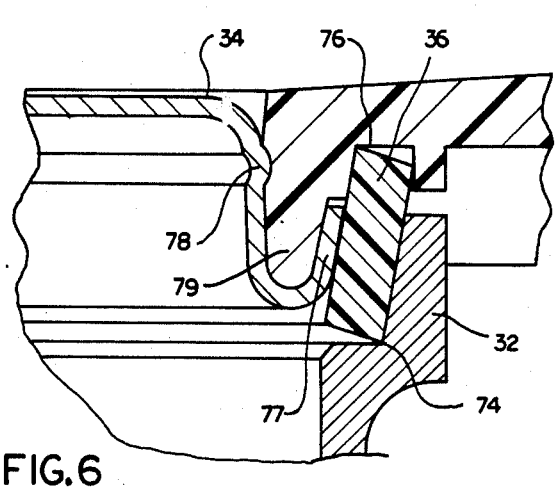
FIG. 6 is an enlarged sectional view of the circled portion in FIG. 2 marked with the numeral 6.

FIG. 6 shows in more detail the resilient seal 36 between cover member 34 and the heater casting 32. As seen in FIG. 3, the heater casting 32 is completely circular. A circular structure, such as heater casting 32, is much easier to seal effectively than an irregularly shaped object or a rectangularly shaped object. The seal 36 is generally in the form of a parallelogram which is seated at one end in a recess 74 in casting 32. The recess 74 is in the upper end of casting 32. The other end of resilient seal 36 is received in a recess 76 in the underside of the housing section forming the base 46 of the reservoir 24. One side of the resilient seal 36 is in sealing engagement with an upturned flange 77 of the cover member 34. The upturned flange 77 of the cover member 34 engages a raised rim 79 in the housing section formed in the base portion of the reservoir 24, and the cover member 34 is mechanically staked or crimped at 78 to form a mechanical connection thereto.

Figure 7:
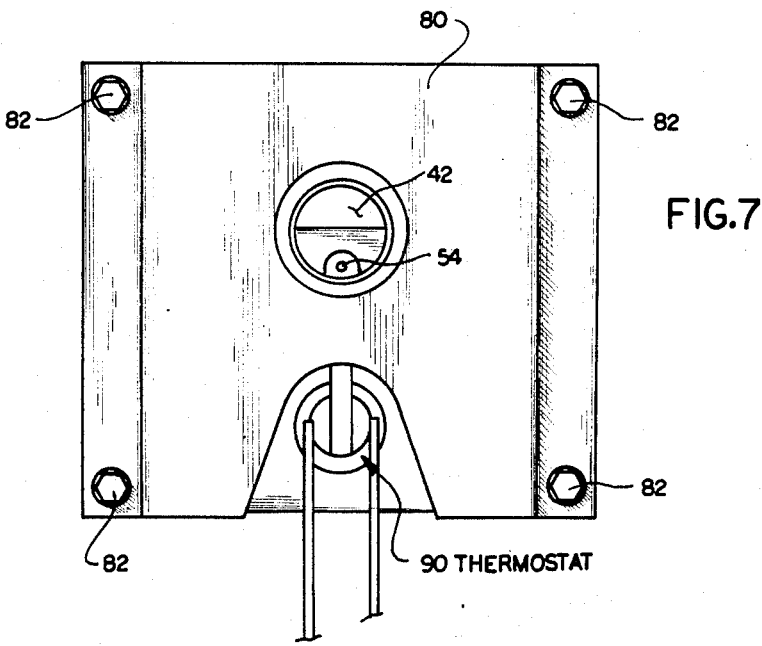
FIG. 7 is a bottom plan view of a clamp biasing the heater casting toward a reservoir and cover member.
Figure 10:
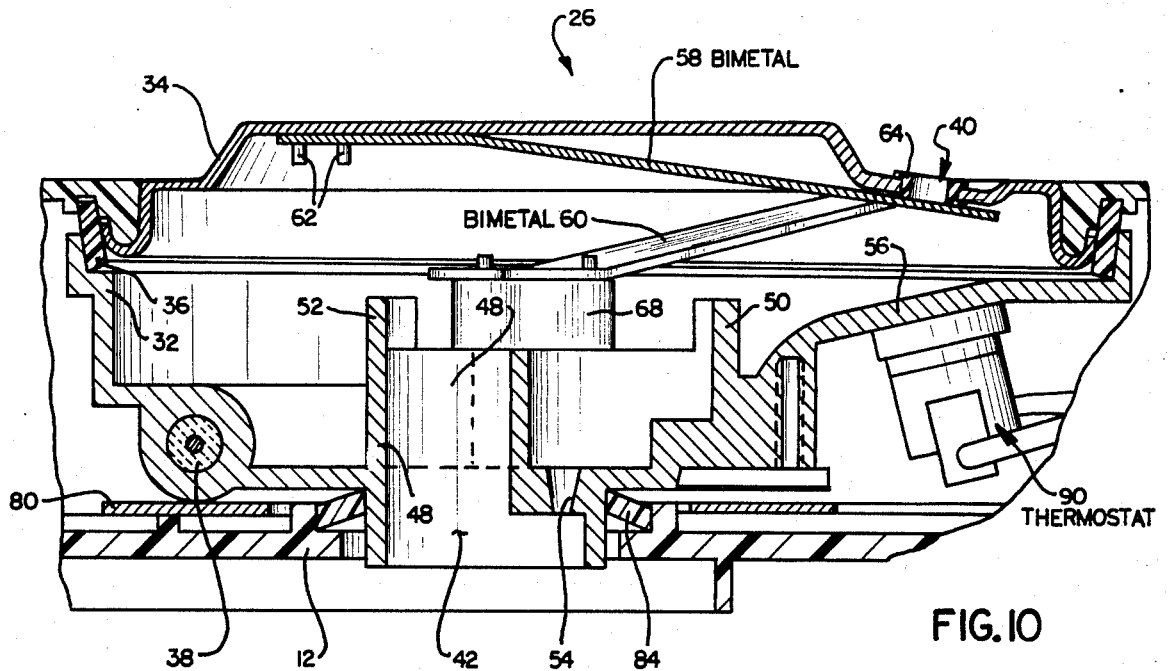
FIG. 10 is an enlarged sectional view of the sealed heating unit depicted in FIG. 1 modified to employ two bimetallic members.
Figure 11:
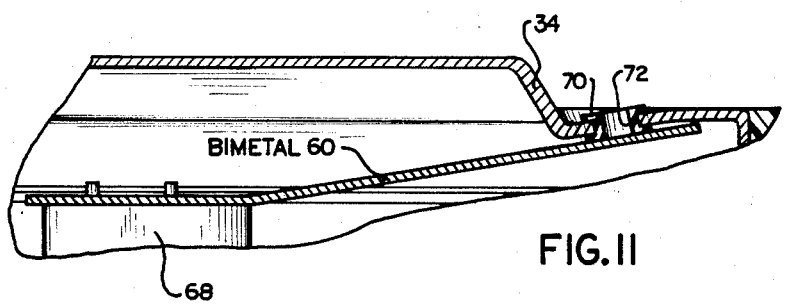
FIG. 11 is an enlarged fragmentary sectional view of the second bimetal 60 depicted in FIG. 10.
Figure 12:
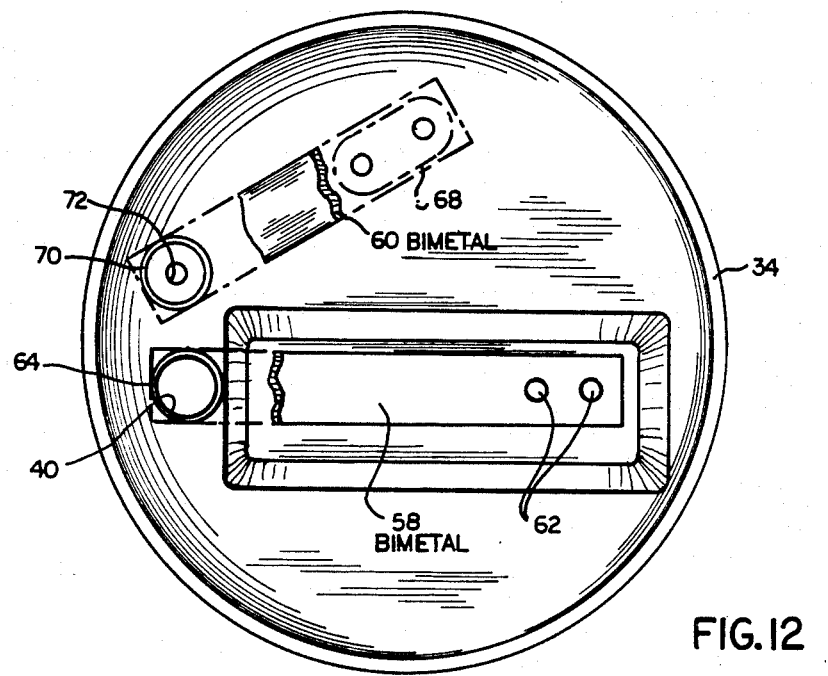
FIG. 12 is a view similar to FIG. 4 but showing the embodiment having two bimetallic members.

A clamp plate 80 is shown in FIG. 7; it is secured by fastening means 82 directly to the housing. The clamp 80 biases the heater casting 32 against resilient seal 36 which in turn forms a seal between the cover member 34 and the heater casting 32. In this manner, clamp plate 80 and heater casting 32 are easily removable from the structure for repair, replacement or other purposes as described in more detail hereinafter.

Figure 8:
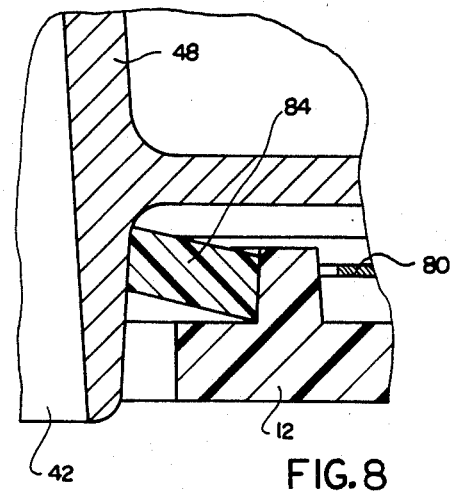
FIG. 8 is an enlarged sectional view of the circled portion in FIG. 2 marked with the numeral 8.

FIG. 8 shows in more detail the lower seal between the outlet 42 of the heater casting 32 and the housing 12. Between a lower extension of the standpipe 48 and a corresponding portion of the housing 12 is a lower seal 84. The lower seal 84 is also a parallelogram similar to upper resilient seal 36. The lower seal 84 prevents the leakage of any steam exiting the outlet 42, as it enters the coffee basket 30, from escaping back up into the area of the housing portion 28 containing electrical components.

The seals 36 and 84 may be constructed of any resilient material which is capable of withstanding sustained service temperatures encountered by automatic drip coffee makers. A preferred material is silicone rubber.

In the preferred embodiment, location of the seal between the heater casting 32 and the cover member 34 and between the heater casting 32 and the lower portion of the water reservoir 24 insures that the polypropylene reservoir tank does not exceed its sustained service temperature. Depending on the material used for the water reservoir, other mechanisms may be used to both support the sealed heating chamber 26 and also assure that no steam escapes the sealed heating chamber 26 without departing from the present invention.

To further insure a good seal between the cover member 34 and the heater casting 32 and to minimize corrosion, the recess 74 of the heater casting 32 can be coated with a polytetrafluoroethylene paint.

Electrical System

The electrical system of the heater casting 32 used in the preferred embodiment of the present invention is depicted in FIG. 9. A thermostat 90 is secured in good thermal contact externally of the heater casting 32 and in a depression formed by the raised portion 56 (FIGS. 2 and 3) in the heater casting 32. Thus, the thermostat is in good thermal contact with the water flowing from the reservoir through outlet 40 so that the thermostat quickly responds to the conditions within the sealed heating unit 26. As described in U.S. Pat. No. 4,000,396, the thermostat 90 is designed to shut off power when an upper temperature is reached, such as in the range of 190°–205° F., and to reset when a lower temperature is reached, such as in the range of 140°–170° F.

Power is provided from the main hook up through leads 92 and 94. The thermostat 90 is in series with the main power leads 92 and 94 leading to the heat resistance rod heater element 38. The electrical heating system of the present invention is protected not only by the thermostat 90 but also by thermal limiters or heat fuses 96 and 98 which are designed to blow if the heater casting attains a temperature above a safe operating temperature. The thermal limiters 96 and 98 are in direct thermal contact with the heater casting 32 and are held in place by integrally cast lugs 100 and 102. The lugs are integral with heater casting 32 and are cast as an integral part thereof so that the thermal limiters 96, 98 have a direct thermal link with the heater casting 32. In contrast, the thermal limiters of U.S. Pat. No. 4,000,396 were screened by an additional thermal barrier in the form of bracket 104, as seen in FIG. 5 of that patent. Bracket 104 also provided a site for possible corrosion which could further reduce any heat transfer.

The thermostat 90 is in series with the main leads 92 and 94. The electrical system is also provided with an additional resistor 104 which is hooked up in series with the main power leads 92, 94, but in parallel with thermostat 90. The suppression resistor 104 is designed to heat the casting 32 by direct thermal contact therewith, and it is held in place by integral lug 106. The suppression resistor heats the casting 32 so that the casting stays above the closing point of the thermostat 90 to prevent recycling of the operation of the coffee brewer.

Operation, Purpose and Advantages

The operation of the general brewing cycle of the present invention, particularly the bimetallic member 58, is similar to that of U.S. Pat. No. 4,000,396 and need not be described in any detail herein.

The sealed heating chamber of the present invention confines steam to the sealed heating chamber 26 and prevents the steam from recondensing into other portions of the apparatus, particularly portions of the housing 28 containing electrical components. Because of the sealed heating chamber 26, the heating unit of the present invention generates less steam than prior art apparatus and reduces the heat loss to the surrounding atmosphere by reason of escaping steam. The thermally conductive cover member 34 helps preheat the reservoir water, cool the bimetallic member for proper modulation, and recondense the steam within the sealed heating chamber.

The use of a heater casting 32 also has several advantages. The heating unit of the present invention is much cheaper than that for example disclosed in U.S. Pat. No. 4,000,396, not only because of the ability to use nonthermally conductive materials for the reservoir (e.g., plastic), but also because the structure of the present invention permits the use of a non-immersion type resistance heating rod 38. Embedment of the heating element 38 within the casting 32 avoids direct water/heating element contact. The heater casting of the present invention also provides better heat transfer to the thermal limiter fuses 96, 98. Better heat transfer provides for a better and more accurate response of the thermal limiter resistors 96, 98. The casting of the present invention is also circular which permits easy sealing to confine the steam. Moreover, the heater casting of the present invention is much quieter than the structure of U.S. Pat. No. 4,000,396.

The sealed heating unit of the present invention also has fewer parts, is easier to assemble and has a more easily removable heating element for repair or replacement.

Unlike the prior art, the present invention also has a structure designed to prevent leakage of steam even from the outlet of the heating chamber into other portions of the housing which may contain electrical components. The design of the present invention also has fewer heat transfer barriers between the resistant rod heater elements and the water compared to some prior art structures without the need for using the more expensive immersion type heaters. The structure of the present invention also reduces the areas for possible corrosion.

Because of the structure of the present invention, the reservoir can be formed of a plastic material which is much cheaper than a metallic material. The reservoir therefore need not be constructed of a material capable of withstanding the high service temperatures within the sealed heating chamber, but instead the reservoir can be insulated therefrom.

The heating system of the present invention also generates a lesser amount of steam than the commercial brewer made under U.S. Pat. No. 4,000,396 and much less steam compared to pump type models which ended up pumping large quantities of generated steam into the brewing cycle.

What is claimed is:

1. An electric automatic water heating apparatus comprising:
   a housing having an area containing electrical components,
   a reservoir in said housing for receiving and holding water to be heated, said reservoir being composed of a material of low thermal conductivity,
   a sealed heating chamber in said housing having a water inlet means in fluid communication with said reservoir for receiving water by gravity and an outlet for discharging heated water for use,
   said sealed heating chamber comprising an open tip heating member of high thermal conductivity for receiving and heating water from said reservoir,
   a heating element embedded in said high thermally conductive heating member, and
   a high thermal conductivity cover member secured to and covering the open top of said heating member and adapted to confine steam generated during heating to said sealed heating chamber,
   said cover member being secured to said reservoir,
   means for blocking the flow of steam or water from said sealed heating chamber into said housing area containing electrical components,
   said cover member having a first surface exposed to any water present in said reservoir and forming a bottom surface portion of said reservoir, said cover member including said water inlet means, and
   flow control means including a temperature sensing element for controlling the flow of water from said reservoir through said water inlet means into said sealed heating chamber in response to the sensed temperature in said sealed heating chamber.

2. Apparatus as claimed in claim 1 including a resilient seal means between said cover member and said heating member.

3. Apparatus as claimed in claim 2 including means to clamp said heating member to said cover member.

4. Apparatus as claimed in claim 3 wherein said clamp means comprises a plate engaging said heating member and fastening means securing said plate to bias said heating member toward said cover member.

5. Apparatus as claimed in claim 1 wherein said means for blocking the flow of steam or water from said sealed heating chamber comprises a seal between said sealed heating chamber and said housing.

6. Apparatus as claimed in claim 5 wherein said seal between said sealed heating chamber and said housing comprises a resilient seal surrounding an outlet from said sealed heating chamber.

7. Apparatus as claimed in claim 1 wherein said thermally conductive cover member is mechanically secured to said reservoir, and said thermally conductive heating member is sealed to said cover member by a resilient seal means.

8. Apparatus as claimed in claim 1 wherein said thermally conductive heating member comprises a metallic casting and said heating element is an electrical resistance rod-type heating element embedded within said casting.

9. Apparatus as claimed in claim 8 wherein said inlet means and said outlet are horizontally offset from each other to provide a partially horizontal flow path for the water from said inlet means to said outlet within said sealed heating chamber, and means for deflecting the flow of water away from a direct path between said inlet means and said outlet.

10. Apparatus as claimed in claim 9 wherein said means for deflecting the flow of water comprises a standpipe through a central aperture forming said outlet in a well bottom of said sealed heating chamber and a barrier means between said inlet means and said standpipe to further deflect the flow of water from a direct path between said inlet means and said outlet.

11. Apparatus as claimed in claim 1 wherein said water inlet means comprises a first opening for the flow of water from said reservoir into said sealed heating chamber, and said flow control means comprises a first bimetallic member for controlling the flow of water through said first opening.

12. Apparatus as claimed in claim 4 wherein said first bimetallic member is supported by said cover member and said water inlet means comprises a perforation through said first bimetallic member in alignment with said first opening to permit a trickle flow of water into said sealed heating chamber when said sealed heating chamber is unheated, said perforation being smaller than the open area of said first opening.

13. Apparatus as claimed in claim 4 wherein said first bimetallic member is supported by said cover member and controls fluid flow through said first opening, and said water inlet means further comprises means defining a second opening in said cover member, and said flow control means furhter comprises a second bimetallic member secured to said thermally conductive heating member for controlling fluid flow through said second opening, said second bimetallic member being directly responsive to heat transferred from said thermally conductive heating member to initiate fluid flow through said second opening into said sealed heating chamber to thereby raise the temperature in said sealed heating chamber to thereby actuate said first bimetallic member to initiate and control fluid flow through said first opening.

14. An electric automatic water heating apparatus comprising:
   a housing having an area containing electrical components,
   a reservoir in said housing for receiving and holding water to be heated, said reservoir being composed of material of low thermal conductivity,
   a sealed heating chamber in said housing having a water inlet means in fluid communication with said reservoir for receiving water by gravity and an outlet for discharging heated water for use,
   said sealed heating chamber comprising an open top heater casting of high thermal conductivity for receiving and heating water from said reservoir,
   a heating element embedded in said heater casting, and
   a cover member of high thermal conductivity secured to and covering the open top of said heater casting and adapted to confine steam generated during heating to said sealed heating chamber,
   said cover member being secured to said reservoir,
   first means for sealing said heater casting and said cover member to seal the perimeters of said cover member and said heater casting to one another,
   means to clamp said first sealing means between said heater casting and said cover member,
   second means for sealing an outlet from said sealed heating chamber to said housing to block the flow of steam into said housing area containing electrical components,
   said cover member having a first surface exposed to any water present in said reservoir and forming a bottom surface portion of said reservoir, and
   flow control means comprising a bimetallic member for controlling the flow of water from said reservoir through said water inlet means into said sealed heating chamber in response to the sensed temperature in said sealed heating chamber.

* * * * *